US006714259B2

(12) United States Patent
Kim

(10) Patent No.: US 6,714,259 B2
(45) Date of Patent: Mar. 30, 2004

(54) METHOD AND APPARATUS FOR RECEIVING DIGITAL TELEVISION SIGNALS FROM A PLURALITY OF INDEPENDENT CHANNELS

(75) Inventor: Yeong-Taeg Kim, Milpitas, CA (US)

(73) Assignee: Samsung Electronics Co., Ltd., Suwon (KR)

(*) Notice: Subject to any disclaimer, the term of this patent is extended or adjusted under 35 U.S.C. 154(b) by 415 days.

(21) Appl. No.: 09/793,293

(22) Filed: Feb. 26, 2001

(65) Prior Publication Data

US 2001/0033342 A1 Oct. 25, 2001

Related U.S. Application Data

(60) Provisional application No. 60/185,348, filed on Feb. 26, 2000.

(51) Int. Cl.$^7$ .................... H04N 5/268; H04N 5/455
(52) U.S. Cl. ................. 348/706; 348/725; 348/726; 348/553
(58) Field of Search .................... 348/725, 705, 348/706, 726, 727, 728, 553, 554, 563, 564, 565, 566, 567, 584, 598, 599; 375/316, 324; H04N 5/44, 5/445, 5/45, 9/74, 5/455, 5/268

(56) References Cited

U.S. PATENT DOCUMENTS

| | | | | |
|---|---|---|---|---|
| 5,933,192 A | * | 8/1999 | Crosby et al. | 375/240.25 |
| 6,118,498 A | * | 9/2000 | Reitmeier | 348/725 |
| 6,212,680 B1 | * | 4/2001 | Tsinberg et al. | 725/39 |
| 6,425,372 B1 | * | 7/2002 | Hiltner | 123/435 |
| 6,473,137 B1 | * | 10/2002 | Godwin et al. | 348/725 |
| 6,538,704 B1 | * | 3/2003 | Grabb et al. | 348/731 |
| 6,542,203 B1 | * | 4/2003 | Shadwell | 348/726 |

FOREIGN PATENT DOCUMENTS

JP    2000201302    *  7/2000

* cited by examiner

Primary Examiner—Sherrie Hsia
(74) Attorney, Agent, or Firm—Kenneth L. Sherman, Esq.; Myers Dawes Andras & Sherman; Jeffrey P. Aiello

(57) ABSTRACT

Methods and apparatus are described for receiving digital television signals where the receiver is capable of demodulating and demultiplexing the digital television signals from multiple, independent transmission channels. The preferred embodiment of the present invention provides for a Dual Channel Digital TV Receiver which receives signals from two independent transmission channels. In order to address each of the digital television signals from the two independent transmission channels, the Dual Channel Digital TV Receiver of the preferred embodiment of the present invention includes two independent paths for channel demodulation and transport stream demultiplexing. Thus, within the Dual Channel Digital TV Receiver of the preferred embodiment of the present invention, a signal from each of the transmission channels are received, decoded and sent for further processing or viewing, as desired by the user. By providing this dual channel signal processing capability, the Dual Channel Digital TV Receiver of the preferred embodiment allows for versatile program viewing capabilities, including but not limited to, allowing the user to view a program from any one of the transmission channels being accessed, allowing for the recording of programs from one or multiple transmission channels to a digital storage device (which digital storage device may be a part of the Dual Channel Digital TV Receiver), allowing the user to view a program from one transmission channel while recording programs from one or more transmission channels, replaying previously recorded programs, and replaying previously recorded programs while recording programs of one or more transmission channels.

37 Claims, 6 Drawing Sheets

Block diagram of the Dual Channel Digital TV System.

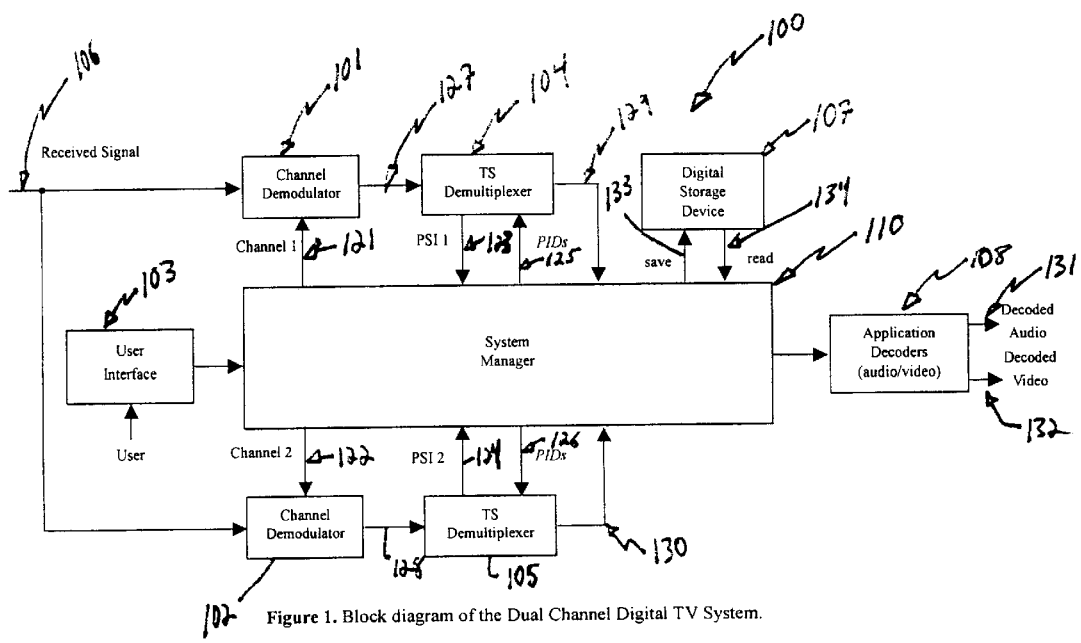
Figure 1. Block diagram of the Dual Channel Digital TV System.

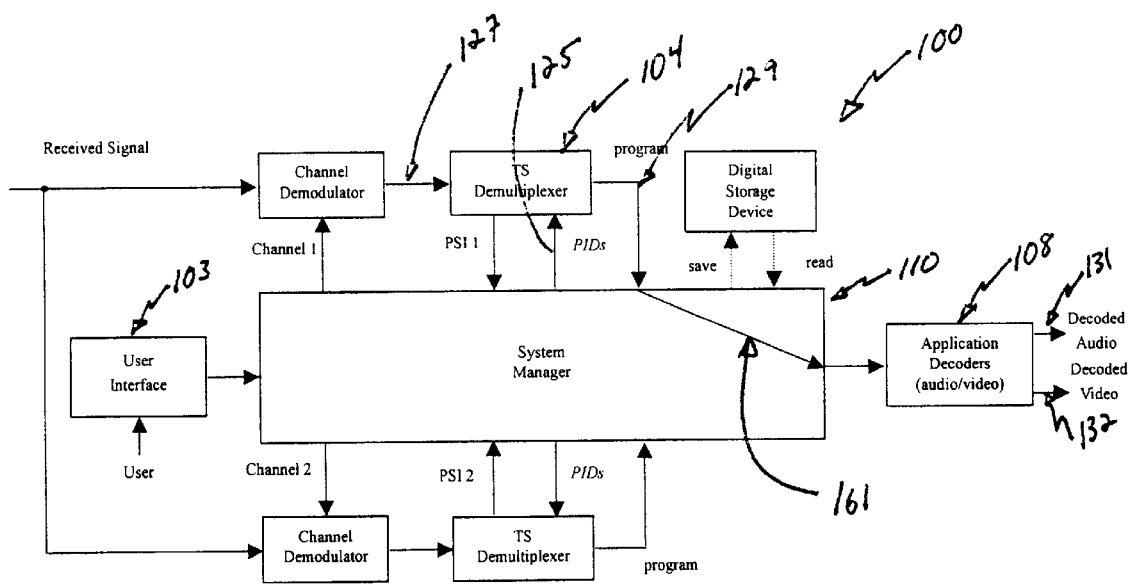
Figure 2. Data flow of the Dual Channel Digital TV Receiver when viewing a program of one channel.

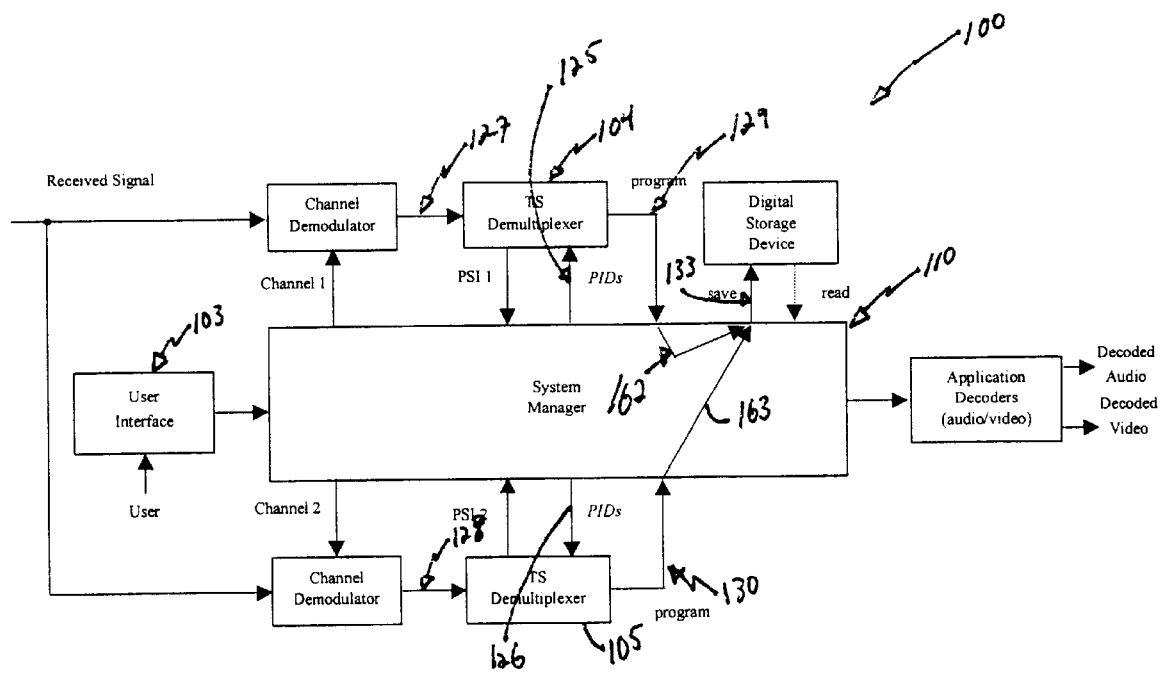
Figure 3. Data flow of the Dual Channel Digital TV Receiver when recording program(s) of one or both channels.

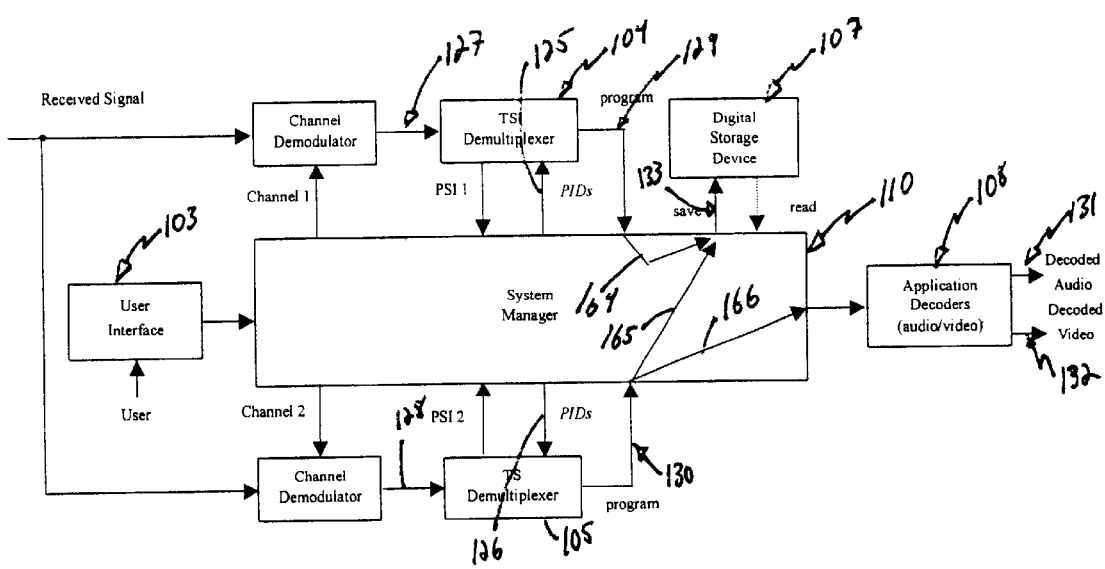
Figure 4. Data flow of the Dual Channel Digital TV Receiver for viewing a program of one channel while saving program(s) of the other channel or both channels.

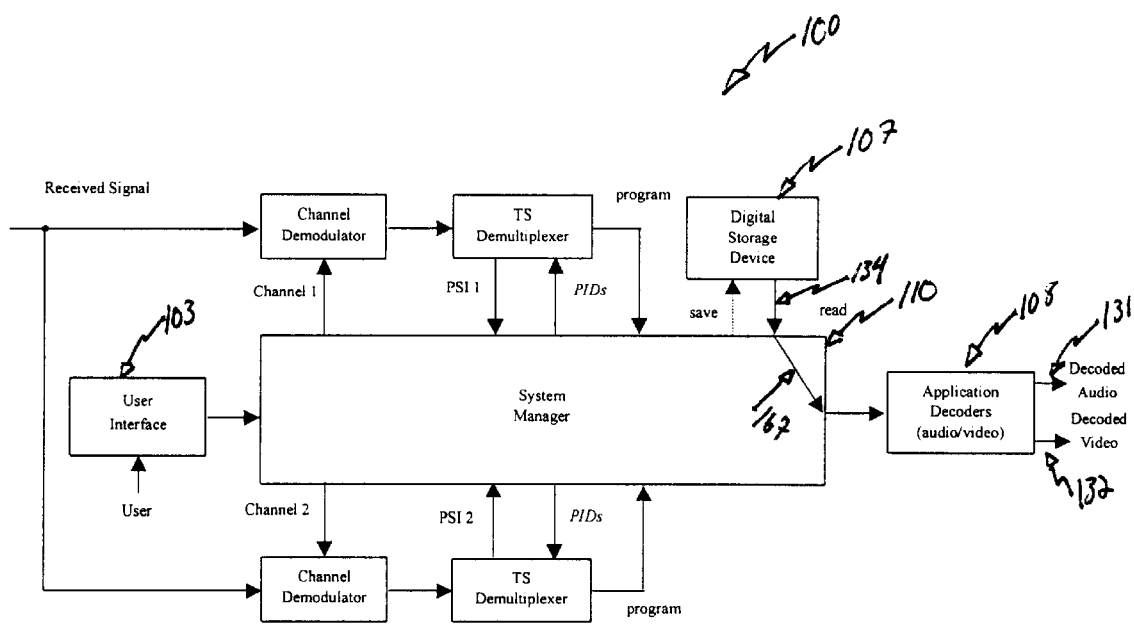
Figure 5. Data flow of the Dual Channel Digital TV Receiver for replaying a saved program.

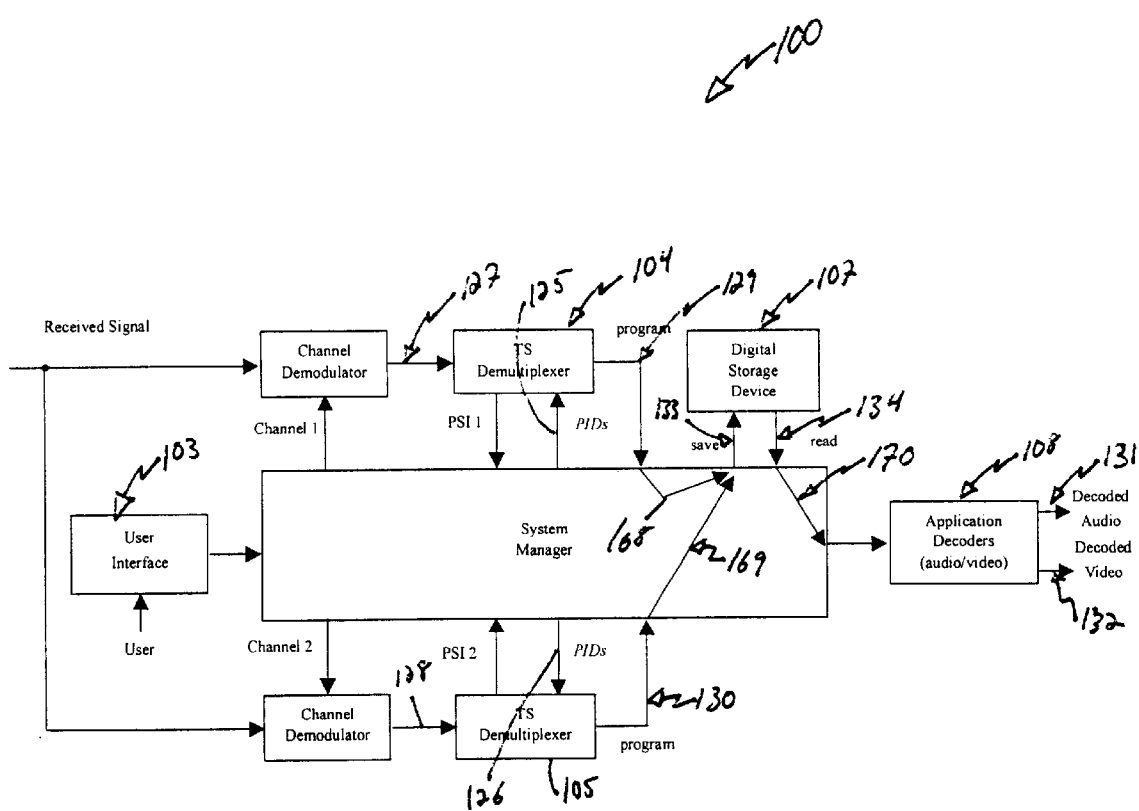
Figure 6. Data flow of the Dual Channel Digital TV Receiver for recording program(s) of one or both channels while replaying a saved program.

METHOD AND APPARATUS FOR RECEIVING DIGITAL TELEVISION SIGNALS FROM A PLURALITY OF INDEPENDENT CHANNELS

CROSS-REFERENCES TO RELATED APPLICATIONS

Applicant claims the benefit of the U.S. Provisional Application No. 60/185,348 entitled "A Dual Channel Digital TV Receiver," filed Feb. 26, 2000, which application is incorporated herein by reference.

FIELD OF THE INVENTION

This invention relates to digital television receivers, and more particularly, to a method and apparatus for providing a digital television receiver which is fundamentally capable of demodulating and demultiplexing digital TV signals from a plurality of physically independent channels.

BACKGROUND OF THE INVENTION

Digital television broadcasts are well known in the art. Common digital video service networks which provide digital television broadcasts to user's include digital cable TV, digital satellite TV, video-on-demand, and terrestrial digital TV broadcasting systems. In each of these services a service operator broadcasts information to a multitude of end users in the form of digital television signals provided over a specific transmission channel.

For example, in digital satellite television broadcasting a service operator transmits its signal over a satellite channel, i.e., from a transmission antenna to a satellite, and then from the satellite to a satellite dish antenna at a user's home. The signal is then fed from the satellite dish antenna to a receiver for demodulation and demultiplexing so that the user may use the received signal.

In another example, digital cable television broadcasts are transmitted by a service operator over a hardwired cable network directly into the user's home. That transmission channel, the digital television cable, is hardwired directly into the user's receiver for demodulation and demultiplexing, so that the user may use the received signal.

In each of these examples, the receiver obtains the signal from a specific transmission channel. However, oftentimes users desire to receive their digital television signals from multiple transmission channels.

Currently, the art does not provide for this functionality. If a user desires multiple transmission channel inputs, then the user must have a receiver to communicate with each respective, independent transmission channel. Each receiver is configured to demodulate and demultiplex the specific signal from the respective transmission channel and then send the end signal to the television for viewing.

This requirement for multiple receivers to communicate with multiple transmission channels is wasteful, costly and redundant. Requiring the user to obtain multiple receivers also provides an artificial block to competition in television broadcasting. Once a user obtains hardware in conjunction with a specific service, they will be less likely to switch to another service if they are displeased with that original service due to the additional requirement that they also obtain new hardware.

Thus, there is a need to eliminate this redundancy and provide a system which allows users to access multiple broadcast transmission channels, whether that access is to the multiple channels at the same time or in seriatim. There is a further need to minimize the cost for users to access multiple transmission channels and to provide users with increased choices for receiving information.

Digital television signals are generally broadcast in the MPEG-2 format. MPEG-2 is a well known standard which was adopted on Nov. 4, 1994 by the ISO (International Organization for Standards) Motion Picture Experts Group (MPEG) for audio/video digital signal compression, configuration and transmission. The MPEG-2 Standard allows for consistent and uniform digital video signal sampling, coding, transmission and reception throughout the world and is very well known in the art.

Through the known systems designed according to the MPEG-2 Standard (which is also known as International Standard ISO/IEC 13818-1), the packetizing, multiplexing, and sending of coded bit streams of multiple programs may be accomplished. Using this standard signal configuration, multiple programs, along with audio and video overlays may be transmitted by a service operator and received by an end user over a specific transmission channel. Details of MPEG-2 Systems can be also found in the textbook, Digital Video: An Introduction to MPEG-2, Barry G. Haskell and et. al., Champman and Hall, New York, N.Y., USA, 1997.

Since the adoption of the MPEG-2 Standard, service networks have proliferated around the world which networks provide digital television programming to end users. Each of these digital television broadcast services provide an MPEG-2 signal to end users over one of the transmission channels discussed above.

OBJECTS OF THE INVENTION

Therefore, it is an object of the present invention to provide methods and apparatus for digital television reception which allow users to receive their digital television signals from multiple transmission channels.

It is yet another object of the present invention to provide methods and apparatus for digital television reception which allow users to eliminate the redundancy of multiple receivers to simultaneously access multiple independent transmission channels.

It is yet still another object of the present invention to provide methods and apparatus for digital television reception which allow users to reduce the cost of digital television reception.

These, together with other objects of the present invention, along with the various features of novelty which characterize the present invention, are pointed out with particularity in the claims annexed to and forming a part of this disclosure.

SUMMARY OF THE INVENTION

The above and other objects are achieved by the present invention, which provides methods and apparatus for receiving digital television signals where the receiver is capable of demodulating and demultiplexing the digital television signals from multiple, independent transmission channels.

The preferred embodiment of the present invention provides for a Dual Channel Digital TV Receiver which receives signals from two independent transmission channels. However, the present invention should not be limited to the preferred embodiment and may be applied to any number of independent transmission channels by extrapolating the principles shown within the preferred Dual Channel Digital TV Receiver.

In order to address each of the digital television signals from the two independent transmission channels, the Dual Channel Digital TV Receiver of the preferred embodiment of the present invention includes two independent paths for channel demodulation and transport stream demultiplexing. Thus, within the Dual Channel Digital TV Receiver of the preferred embodiment of the present invention, signals from each of the transmission channels are received, decoded and sent for further processing or viewing, as desired by the user.

By providing this dual channel signal processing capability, the Dual Channel Digital TV Receiver of the preferred embodiment of the present invention allows for versatile program viewing capabilities, including but not limited to, allowing the user to view a program from any one of the transmission channels being accessed, allowing for the recording of programs from one or multiple transmission channels to a digital storage device (which digital storage device may be a part of the Dual Channel Digital TV Receiver), allowing the user to view a program from one transmission channel while recording programs from one or more transmission channels, replaying previously recorded programs, and replaying previously recorded programs while recording programs of one or more transmission channels.

The preferred receiver for a digital video service network which embodies the present invention comprises: a first means for receiving a first digital television signal from a first transmission channel; a second means for receiving a second digital television signal from a second transmission channel; a means for decoding at least the first digital television signal or the second digital television signal; and a means for providing an output signal reflective of a television program contained within either the first digital television signal or the second digital television signal.

The preferred method for receiving digital television signals used by the preferred embodiment of the present invention, comprises the steps of: receiving a first digital television signal from a first transmission channel; receiving a second digital television signal from a second transmission channel; decoding the first digital television signal; decoding the second digital television signal; and providing an output signal reflective of a television program contained within either the first digital television signal or the second digital television signal.

BRIEF DESCRIPTION OF THE DRAWINGS

The foregoing and other objects, advantages and features of the invention, and the manner in which the same are accomplished, will become more readily apparent upon consideration of the following detailed description of the preferred embodiment of the present invention taken in conjunction with the accompanying drawings which illustrate preferred and exemplary embodiments, and wherein:

FIG. 1 shows a basic block diagram illustration of the functional architecture of the Dual Channel Digital TV Receiver of the preferred embodiment of the present invention.

FIG. 2 shows a basic block diagram illustration of the program data flow for the Dual Channel Digital TV Receiver of the preferred embodiment of the present invention when the receiver is playing a specific program selected by the user from one of the transmission channels.

FIG. 3 shows a basic block diagram illustration of the program data flow for the Dual Channel Digital TV Receiver of the preferred embodiment of the present invention when the receiver is recording one or more selected programs from the signals of one or both independent transmission channels which feed into the Dual Channel Digital TV Receiver 100.

FIG. 4 shows a basic block diagram illustration of the program data flow for the Dual Channel Digital TV Receiver of the preferred embodiment of the present invention when the receiver is simultaneously recording one or more selected program(s) from the signals of one or both independent transmission channels which feed into the Dual Channel Digital TV Receiver and, at the same time, directly playing a specific program selected by the user from the combined signal received from one of the independent transmission channels.

FIG. 5 shows a basic block diagram illustration of the program data flow for the Dual Channel Digital TV Receiver 100 of the preferred embodiment of the present invention when the receiver playing back a previously stored program.

FIG. 6 shows a basic block diagram illustration of the program data flow for the Dual Channel Digital TV Receiver of the preferred embodiment of the present invention when the receiver is simultaneously recording one or more selected program(s) from the signals of one or both independent transmission channels which feed into the Dual Channel Digital TV Receiver and, at the same time replaying a specific previously recorded program.

DETAILED DESCRIPTION OF THE PREFERRED EMBODIMENT

The following description is provided to enable any person skilled in the art to make and use the invention and sets forth the best modes presently contemplated by the inventors for carrying out this invention. Various modifications however, will remain readily apparent to those skilled in the art, since the generic principles of the present invention have been completely defined.

The present invention provides methods and apparatus for receiving and processing digital television signals from multiple, independent transmission channels. By way of example, the preferred embodiments of the present invention describe various structures and functionalities for a Dual Channel Digital TV Receiver whose fundamental characteristic is to process the digital television signal from two physically independent transmission channels. However, the present invention should not be limited to the preferred embodiment and may be applied to any number of independent transmission channels by extrapolating the principles shown within the preferred Dual Channel Digital TV Receiver.

As shown in the following detailed description of the preferred embodiment, the Dual Channel Digital TV Receiver of the preferred embodiment of the present invention can deal with multiple independent programs that a user selects in one or two different and physically independent channels. In the digital television signal broadcast across each independent transmission channel, the programs are composed of one or more (packetized) elementary bitstreams. Each packetized bitstream is labeled with a Packet Identification (PID).

Through use of the below described dual channel processing capability, the Dual Channel Digital TV Receiver of the preferred embodiment of the present invention enables various program viewing options for the users: the user can view a program of one channel, select and record (or, save) program(s) of one or both channels to a digital storage device of the preferred system, view a program of one channel while simultaneously recording the program(s) of that same channel, the other channel, or both channels to the digital storage device, replay the recorded programs, and replay the recorded programs while simultaneously recording program(s) of one or both channels.

FIG. 1 shows a block diagram illustration of the functional architecture of the Dual Channel Digital TV Receiver 100 of the preferred embodiment of the present invention.

The preferred Dual Channel Digital TV Receiver 100 of the present invention receives two separate digital television signals from each of two respective independent transmission channels (not shown). Each of these digital television signals may be received via a satellite antenna, a hard-wired digital cable or any other signal reception system commonly known in the art. In the preferred Dual Channel Digital TV Receiver 100 of the present invention, the two received digital television signals are then sent via a single input 106 to the preferred Dual Channel Digital TV Receiver 100.

As shown in FIG. 1, the preferred Dual Channel Digital TV Receiver 100 includes two independent channel demodulators 101, 102. Each of the two independent channel demodulators 101, 102 receives the combined received digital television signals which are provided at input 106. Each of the two independent channel demodulators 101, 102 extracts channel specific bitstreams from one of the respective received signals of one of the two respective, independent transmission channels.

Each of the independent channel demodulators 101, 102 is configured to demodulate the signal received at input 106 based upon a channel selection command 121, 122 sent from a System Manager 110. These channel selection commands 121, 122 are chosen based upon the user's tuning choices and selections which are input at a User Interface 103. This User Interface interfaces between the System Manager 110 and the user.

Once the independent channel demodulators 101, 102 extract their specific bitstreams of the chosen channels from the combined received digital television signal, those channel specific bitstreams are then fed to two independent Transport Stream (TS) Demultiplexers 104, 105. The Transport Stream (TS) Demultiplexers 104, 105 then demultiplex the TS packets coming out of the channel demodulation units 101,102.

The preferred Dual Channel Digital TV Receiver 100 of the present invention includes the System Manager 110 to control the flow of information within and the operation of the Dual Channel Digital TV Receiver 100. When the channel specific bitstreams are demultiplexed by the two independent Transport Stream (TS) Demultiplexers 104, 105, the System Manager 110 obtains Program Specific Information (PSI) 123, 124 for each of the respective chosen channel specific bitstreams. The Program Specific Information (PSI) is embedded in the TS packets as tables. The System Manager 110 delivers the Program Specific Information (PSI) 123, 124 of the selected channel specific bitstreams to the user at the User Interface 103, and receives the user's choices regarding program selection, request for viewing, recording, and replaying, etc.

In response to the user's selections, the System Manager 110 controls and manages the flow of the bitstreams regarding the selected programs in accordance with the user's requests and feeds packet identifications (PIDs) 125, 126 to the associated channel specific TS Demultiplexers 104,105 to select the associated bitstreams of the programs that the user has selected.

The preferred Dual Channel Digital TV Receiver 100 of the present invention also includes a Digital Storage Device 107 for saving and reading the bitstreams of selected programs, a controller which controls and manages the saving and reading process of the bitstreams of the programs that the user has selected, and Application Decoders 108 which decode the coded audio and video bitstreams of a given program that the controller assigns for viewing.

A specific description of the Program Specific Information (PSI) in an MPEG-2 digital television signal can be obtained from the International Standard ISO/IEC 13818-1, which is known in the art and incorporated herein by reference. International Standard ISO/IEC 13818-1 also includes an explanation of TS packetization, and reference should be made to the TS syntax defined therein.

Typical steps which may be used to get the Program Specific Information (PSI) from the Transport Stream Packets is to first find the Program Associated Table (PAT) which contains the program numbers and the Packet Identification (PID) of the associated Program Map Tables (PMT). Then, once the Program Map Tables (PMT) are obtained, the respective Packet Identifications (PID) of the elementary or packetized elementary bitstreams of the programs available in the channel can be obtained from the Program Map Tables (PMT), and utilized by the System Manager 110, as discussed above to process the bitstreams of the programs that the user has selected for viewing and or processing.

The basic operation of the Dual Channel Digital TV Receiver 100 of the preferred embodiment of the present invention shown in FIG. 1 follows. First, the user selects two channels (Channel 1 and Channel 2) for processing by the preferred Dual Channel Digital TV Receiver 100. The user selects these channels by inputting their selection into the User Interface 103.

Once these channel selections are input into the User Interface 103 by the User, the User Interface 103 then instructs the System Manager 110 to configure the respective Channel Demodulators 101, 102 by sending inputs 121, 122 to the Channel Demodulators 101, 102. The Channel Demodulators 101, 102 are configured to extract the chosen channel specific bitstreams 127, 128 from the combined digital television signal at input 106, and provide those chosen channel specific bitstreams 127, 128 to the respective TS Demultiplexers 104, 105.

From the received channel specific bitstreams 127,128, the TS Demultiplexers 104,105 then provides the System Manager 110 with the Program Specific Information (PSI) for each channel (PSI 1 123 and PSI 2 124). The Program Specific Information (PSI) for each channel (PSI 1 123 and PSI 2 124) contains the programs and the associated Packet Identification (PID) information for those programs.

The System Manager 110 delivers the Program Specific Information (PSI) from the respective selected channels to the User Interface 103 for the user to select specific program (s) to view and/or save. Based on the user's instructions input into the User Interface 103 to view and/or save specific program(s), the System Manager 110 feeds the Packet Identifications (PID)s associated with the selected program (s) along inputs 125, 126 to the respective TS Demultiplexers 104, 105 for the specific channels.

Based on the user's instructions input into the User Interface 103, the System Manager 110 also manages the flow of bitstreams of the selected programs through the preferred Dual Channel Digital TV Receiver 100 in accordance with the user's requests. That is, the specific program which was selected by the user for viewing goes through the TS Demultiplexers 104, 105 along the respective inputs 129, 130 through the System Manager 110 to the Application Decoders 108.

Additionally, the bitstreams from the specific program(s) which were selected by the user for saving or recording are sent from the TS Demultiplexers 104, 105 along the respective inputs 129, 130 through the System Manager 110 to the Digital Storage Device 109. In the recording mode for the Dual Channel Digital TV Receiver 100 of the preferred embodiment of the present invention, the System Manager 110 controls the Digital Storage Device 107, and the user can decide to save multiple programs simultaneously. Simultaneous recording of multiple programs is explained in more detail below with reference to FIGS. 3, 4 and 6.

In the preferred embodiment of the Dual Channel Digital TV Receiver 100, the Dual Channel Digital TV Receiver 100 itself contains a Digital Storage Device 107. However, the present invention should not be so limited and the Digital Storage Device 107 maybe its own self contained unit. A further receiver may be constructed according to the present invention without a Digital Storage Device 107, whereby the Dual Channel Digital TV Receiver 100 can operate only in "program viewing" mode or programs may be saved to an external Digital Storage Device 107.

The preferred embodiment of the Dual Channel Digital TV Receiver 100 also allows the user to request to the System manager 110 to replay a previously saved program which was stored in the Digital Storage Device 107. When the user inputs a replay request into the User Interface 103, the System Manager 110 reads the selected previously recorded program from the Digital Storage Device 107 and delivers the selected previously recorded program to the Application Decoders 108. The Applications Decoders 108 then decode the incoming coded bitstreams of the selected program and send out decoded audio and video output signal 131, 132.

The preferred embodiment of the Dual Channel Digital TV Receiver 100 also allows the user to request to digitally record selected programs from the transmission channels while viewing another previously recorded program. When the user decides to operate in this mode the specific program (s) which the user selects for recording are sent from the specific TS Demultiplexer 104 or 105, as the case may be, to the Digital Storage Device 107, and the selected previously recorded program is simultaneously sent from the Digital Storage Device 107 to the Application Decoders 108.

FIG. 2 shows a basic block diagram illustration of the program data flow for the Dual Channel Digital TV Receiver 100 of the preferred embodiment of the present invention when the receiver is directly playing a specific program selected by the user from the combined signal received from one of the independent transmission channels. As shown in FIGS. 2–6, the internally connected arrow lines inside the System Manager 110 represent the flow of the selected program(s) data within the Dual Channel Digital TV Receiver 100 of the preferred embodiment of the present invention.

In this "single channel decode mode," the user selects a specific program for viewing from the Program Specific Information (PSI) received from Channel 1. The user inputs their instructions at the User Interface 103. From this instruction at the User Interface 103, the System Manager 110 provides Packet Identification (PID) control signals for that selected program along input 125 to TS Demultiplexer 104 and instructs the TS Demultiplexer 104 to demultiplex Channel 1's bitstream signal 127.

Based upon this instruction signal 125 received from the System Manager 110, the TS Demultiplexer 104 provides the selected program specific bitstream 129 to the System Manager 110. The System Manager 110 next routes that bitstream signal 161 to the Application Decoders 108. The Applications Decoders 108 then decode the incoming coded bitstreams of the selected program 161 and send out decoded audio and video output signal 131, 132.

FIG. 3 shows a basic block diagram illustration of the program data flow for the Dual Channel Digital TV Receiver 100 of the preferred embodiment of the present invention when the receiver is recording one or more selected program (s) from the signals of one or both independent transmission channels which feed into the Dual Channel Digital TV Receiver 100.

In this "record mode," the user selects specific programs for recording/saving from the Program Specific Information (PSI) received from the transmission Channels 1 and/or 2. The user inputs their instructions at the User Interface 103.

From this instruction at the User Interface 103, the System Manager 110 provides Packet Identification (PID) control signals for the selected program(s) along input 125 to TS Demultiplexer 104 for any program being carried within the channel specific bitstream signal from Channel 1 127, and the System Manager 110 further provides Packet Identification (PID) control signals for the selected program(s) along input 126 to TS Demultiplexer 105 for any program being carried within the channel specific bitstream signal from Channel 2 128. Using these control signals 125, 126, the System Manager 110 instructs the TS Demultiplexers 104, 105, as the case may be, to demultiplex their respective Channel specific bitstream signal 127, 128.

Based upon these instruction signals 125, 126 received from the System Manager 110, the TS Demultiplexers 104, 105 provide the selected program specific bitstreams 129, 130 to the System Manager 110. The System Manager 110 next routes that bitstream signals 162, 163 to the save input 133 of the Digital Storage Device 107 for recording, whether that recording is simultaneously conducted for multiple selected programs or merely direct singular recording for one program.

FIG. 4 shows a basic block diagram illustration of the program data flow for the Dual Channel Digital TV Receiver 100 of the preferred embodiment of the present invention when the receiver is simultaneously recording one or more selected program(s) from the signals of one or both independent transmission channels which feed into the Dual Channel Digital TV Receiver 100, and, at the same time directly playing a specific program selected by the user from the combined signal received from one of the independent transmission channels.

In this "record and display mode," the user selects the specific programs for viewing and/or recording/saving from the Program Specific Information (PSI) received from the transmission Channels 1 and 2. The user inputs their selections for viewing and recording at the User Interface 103.

From these instructions and selections at the User Interface 103, the System Manager 110 provides Packet Identification (PID) control signals for the selected programs along input 125 to TS Demultiplexer 104 for any selected programs being carried within the channel specific bitstream signal from Channel 1 127, and the System Manager 110 further provides Packet Identification (PID) control signals for the selected programs along input 126 to TS Demultiplexer 105 for any chosen programs being carried within the channel specific bitstream signal from Channel 2 128. Using these control signals 125, 126, the System Manager 10 instructs the TS Demultiplexers 104, 105, as the case maybe, to demultiplex their respective Channel specific bitstream signal 127, 128.

Based upon these instruction signals 125, 126 received from the System Manager 110, the TS Demultiplexers 104, 105 provide the selected program specific bitstreams 129, 130 to the System Manager 110.

For the programs that the user selected for recording/saving, the System Manager 110 next routes those bitstream signals 164, 165 to the save input 133 of the Digital Storage Device 107 for recording. In the example shown in FIG. 4, that recording is simultaneously conducted for multiple selected programs. For the program that the user has selected for immediate viewing, the System Manager 110 routes that bitstream signal 166 to the Application Decoders 108. The Applications Decoders 108 then decode the incoming coded bitstreams of the selected program 166 and send out decoded audio and video output signal 131, 132.

FIG. 5 shows a basic block diagram illustration of the program data flow for the Dual Channel Digital TV Receiver 100 of the preferred embodiment of the present invention when the receiver playing back a previously stored program.

In this "playback mode," the user has selected a previously stored program to be replayed from the Digital Storage Device 107. The operation of storing selected programs is discussed in detail above with reference to FIGS. 3 and 4.

Once the user has input their instructions to replay a previously stored selected program at the User Interface 103, the System Manager 110 provides Packet Identification (PID) control signals or file control signals for that previously stored selected program to the Digital Storage Device 107 and instructs the Digital Storage Device 107 to download the corresponding previously stored selected program to read output 134.

Once the System Manager receives those packet bitstreams at read output 134, the System Manager 110 next routes that bitstream signal 167 to the Application Decoders 108. The Applications Decoders 108 then decode the incoming coded bitstreams of the selected program 167 and send out decoded audio and video output signal 131, 132.

FIG. 6 shows a basic block diagram illustration of the program data flow for the Dual Channel Digital TV Receiver 100 of the preferred embodiment of the present invention when the receiver is simultaneously recording one or more selected program(s) from the signals of one or both independent transmission channels which feed into the Dual Channel Digital TV Receiver 100, and, at the same time replaying a specific previously recorded program.

In this "record and playback mode," the user selects the specific programs for recording and/or playback from the Program Specific Information (PSI) which has either been received from the transmission Channels 1 and 2 or relates to the previously recorded programs being stored within the Digital Storage Device 107. The user inputs their selections for recording and playback at the User Interface 103.

From these instructions and selections at the User Interface 103, the System Manager 110 provides Packet Identification (PID) control signals for the selected programs along input 125 to TS Demultiplexer 104 for any programs selected for recording which are being carried within the channel specific bitstream signal from Channel 1 127, and the System Manager 110 further provides Packet Identification (PID) control signals for the selected programs along input 126 to TS Demultiplexer 105 for any programs selected for recording which are being carried within the channel specific bitstream signal from Channel 2 128. Using these control signals 125, 126, the System Manager 110 instructs the TS Demultiplexers 104, 105, as the case may be, to demultiplex their respective Channel specific bitstream signal 127, 128.

Based upon these instruction signals 125, 126 received from the System Manager 110, the TS Demultiplexers 104, 105 provide the selected program specific bitstreams 129, 130 to the System Manager 110.

For these new programs which the user has now selected for recording/saving, the System Manager 110 next routes those bitstream signals 168, 169 to the save input 133 of the Digital Storage Device 107 for recording. In the example shown in FIG. 6, that recording is simultaneously conducted for multiple selected programs 168, 169.

For the program that the user has selected for immediate playback, the System Manager 110 provides Packet Identification (PID) control signals or file control signals for that selected program to the Digital Storage Device 107 and instructs the Digital Storage Device 107 to download the corresponding previously stored selected program to read output 134.

Once the System Manager receives those packet bitstreams at read output 134, the System Manager 110 next routes that bitstream signal 170 to the Application Decoders 108. The Applications Decoders 108 then decode the incoming coded bitstreams of the selected program 170 and send out decoded audio and video output signal 131, 132.

Accordingly, it will be understood that the Dual Channel Digital TV Receiver 100 preferred embodiment of the present invention has been disclosed by way of example only, and that other modifications and alterations may occur to those skilled in the art without departing from the scope and spirit of the appended claims.

Those skilled in the art will appreciate the various adaptations and modifications of the just described preferred embodiments can be configured without departing from the scope and spirit of the invention. Therefore, it is to be understood that, within the scope of the appended claims, the invention may be practiced other than as specifically described herein.

What is claimed is:

1. A receiver for a digital video service network, the receiver comprising:
   an input for receiving an input signal representing a first digital television signal from a first transmission channel and a second digital television signal from a second transmission channel;
   means for decoding at least the first digital television signal or the second digital television signal by selectively extracting bit streams from the input signal describing first or second digital television signal; and
   means for providing an output signal reflective of a television program contained within either the first digital television or the second digital television signal.

2. The receiver of claim 1, wherein the means for decoding the digital television signals includes a Channel Demodulator for selectively demodulating the input signal and extracting bit streams describing first or second digital television signal.

3. The receiver of claim 2, wherein the means for decoding further includes a TS demulitplexer for demultiplexing and outputting Program Specific Information and at least one regular program bitstream from the digital television signals.

4. The receiver of claim 3, wherein the TS demultiplexer outputs the at least one regular program bitstream from the digital television signal based upon packet identification information control signals.

5. The receiver of claim 3, further comprising a System Manager for controlling the Channel Demodulator for selectively demodulating the input signal and extracting the bit streams, and for controlling the TS demultiplexer for demultiplexing and outputting the Program Specific Information and said at least one regular program bitstream, the System Manager further directing a data stream flow of data from the first and second digital television signals.

6. The receiver of claim 1, further comprising a Digital Storage Device for receiving, storing and replaying data reflective of the at least one television program from the first or second digital television signals.

7. The receiver of claim 1, further comprising Application decoders for decoding audio and video coded bit streams of the output television program signal, the Audio/Video decoders sending an Audio output signal for transducing into sound and a decoded video signal for processing and display.

8. A receiver for a digital video service network, the receiver comprising:
   an input for receiving an input signal representing a first digital television signal from a first transmission channel and a second digital television signal from a second transmission channel;
   first means for decoding the first digital television signal be selectively extracting a bit stream from the input signal describing the first digital television signal;
   second means for decoding the second digital televison signal by selectively extracting a bit stream from the input signal describing the second digital television signal; and
   means for providing an output signal reflective of a television program contained within either the first digital television of the second digital television signal.

9. the receiver of claim 8, wherein the first means for decoding the digital television signal includes a Channel Demodulator for selectively demodulating the input signal and extracting bit streams describing the first digital television signal.

10. The receiver of claim 9, wherein the first means for decoding further includes a TS demultiplexer for demultiplexing and outputting Program Specific Information and at least one regular program bitstream from the first digital television signal.

11. The receiver of claim 10, wherein the TS demultiplexer outputs the at least one regular program bitstream from the digital television signal based upon packet identification information control signals.

12. The receiver of claim 10, further comprising a System Manager for controlling the Channel Demodulator for selectively demodulating the input signal and extracting the bit stream, and for controlling the TS demultiplexer for demultiplexing and outputting the Program Specific Information and said at least one regular program bitstream, the System Manager further directing a data stream flow from the first digital television signal.

13. The method of claim 10, wherein the second means for decoding the digital television signals includes a Channel Demodulator to selectively demodulate the input signal and extracting bits streams describing the second digital televison signal.

14. The receiver of claim 13, wherein the second means for decoding further includes a TS demultiplexer for demultiplexing and outputting Program Specific Information and at least one regular program bitstream from the second digital television signal.

15. The receiver of claim 14, further comprising a System Manager that: (i) controls the Channel Demodulator of the first means for decoding to selectively demodulate the input signal and extract the bit stream describing the first digital television signal, and for controlling the TS demultiplexer of the first means for decoding for demultiplexing and outputting the Program Specific Information and said at least one regular program bitstream, and (ii) controls the Channel Demodulator of the second means for decoding to selectively demodulate the input signal and extract the bit stream describing the second digital television signal, and for controlling the TS demultiplexer of the second means for decoding for demultiplexing and outputting the Program Specific Information and said at least one regular program bitstream; the System Manager further directing a data stream flow of data from the first and second digital television signals.

16. The receiver of claim 8, further comprising a Digital Storage Device for receiving, storing and replaying data reflective of the least one television program from the first or second digital television signals.

17. The receiver of claim 8, further comprising Application decoders for decoding audio and video coded bit streams of the output television program signal, the Audio/Video decoders sending an Audio output signal for transducing into sound and a decoded video signal for processing and display.

18. A method for receiving digital television signals, the method comprising the steps of:
   receiving an input signal representing a first digital television signal from a first transmission channel and a second digital television signal from a second transmission channel;
   decoding at least the first digital television signal or the second digital television signal by selectively extracting bit streams from the input signal describing first or second digital television signal; and
   providing an output signal reflective of a television program contained within either the first digital television signal or the second digital television signal.

19. The method of claim 15, further comprising the steps of directing a Channel Demodulator to selectively demodulate the input signal and extract bit streams describing either the first or the second digital television signal.

20. The method of claim 19, further comprising the steps of demultiplexing and outputting Program Specific Information and at least one regular program bitstream from the digital television signals.

21. The method of claim 20, further comprising the steps of providing the Program Specific Information to a user, receiving viewing and recording selections from the user and demultiplexing the at least one regular program bitstream from the digital television signals based upon the user's selections.

22. The method of claim 21, further comprising the step of providing packet identification information control signals to control the demultiplexing of the at least one regular program bitstream from the digital television signals.

23. The method of claim 18, further comprising the step of directing a data stream flow of data from the first and second digital television signals.

24. The method of claim 18, further comprising the steps of receiving, storing and replaying data reflective of the at least one television program from the first or second digital television signals.

25. The method of claim 18, further comprising the steps of decoding audio and video coded bit streams of the output television program signal, and sending an Audio output signal for transducing into sound and a decoded video signal for processing and display.

26. A method for receiving digital television signals, the method comprising the step of:
   receiving an input signal representing a first digital television from a first transmission channel and a second digital television signal from a second transmission channel;

decoding the first digital television signal by selectively extracting a bit stream from the input signal describing the first digital television signal;

decoding the second digital television signal by selectively extracting a bit stream from the input signal describing the second digital television signal; and providing an output signal reflective of a television program contained within either the first second digital television or the second digital television signal.

27. The method of claim 26, further comprising the steps of directing a first Channel Demodulator to selectively demodulate the input signal and extract a bit stream describing the first digital television signal.

28. The method of claim 27, further comprising the steps of demultiplexing and outputting Program Specific Information and at least one regular program bitstream from the first digital television signal.

29. The method of claim 28, further comprising the steps of providing the Program Specific Information to a user, receiving viewing and recording selections from the user and demultiplexing the at least one regular program bitstream from the first digital television signals based upon the user's selections.

30. The method of claim 29, further comprising the step of providing packet identification information control signals to control the demultiplexing of the at least one regular program bitstream from the first digital television signal.

31. The method of claim 27, further comprising the steps of directing a second Channel Demodulator to selectively demodulate the input signal and extract a bit stream describing the second digital television signal.

32. The method of claim 31, further comprising the steps of demultiplexing and outputting Program Specific Information and at least one regular program bitstream from the second digital televison signal.

33. The method of claim 32, further comprising the steps of providing the Program Specific Information to a user, receiving viewing and recording selections from the user and demultiplexing the at least one regular program bitstream from the second digital television signals based upon the user's selections.

34. The method of claim 33, further comprising the step of providing packet identification information control signals to control the demultiplexing of the at least one regular program bitstream from the second digital television signal.

35. The method of claim 26, further comprising the step of directing a data stream flow of data from the first and second digital television signals.

36. The method of claim 26, further comprising the steps of receiving, storing and replaying data reflective of the at least one television program from the first or second digital television signals.

37. The method of claim 26, further comprising the steps of decoding audio and video coded bit streams of the output television program signal, sending an Audio output signal for transducing into sound and a decoded video signal for processing and display.

* * * * *